March 25, 1941. C. HARDY 2,236,474
REDUCTION OF METAL COMPOUNDS WITHOUT FUSION
Filed Dec. 23, 1939
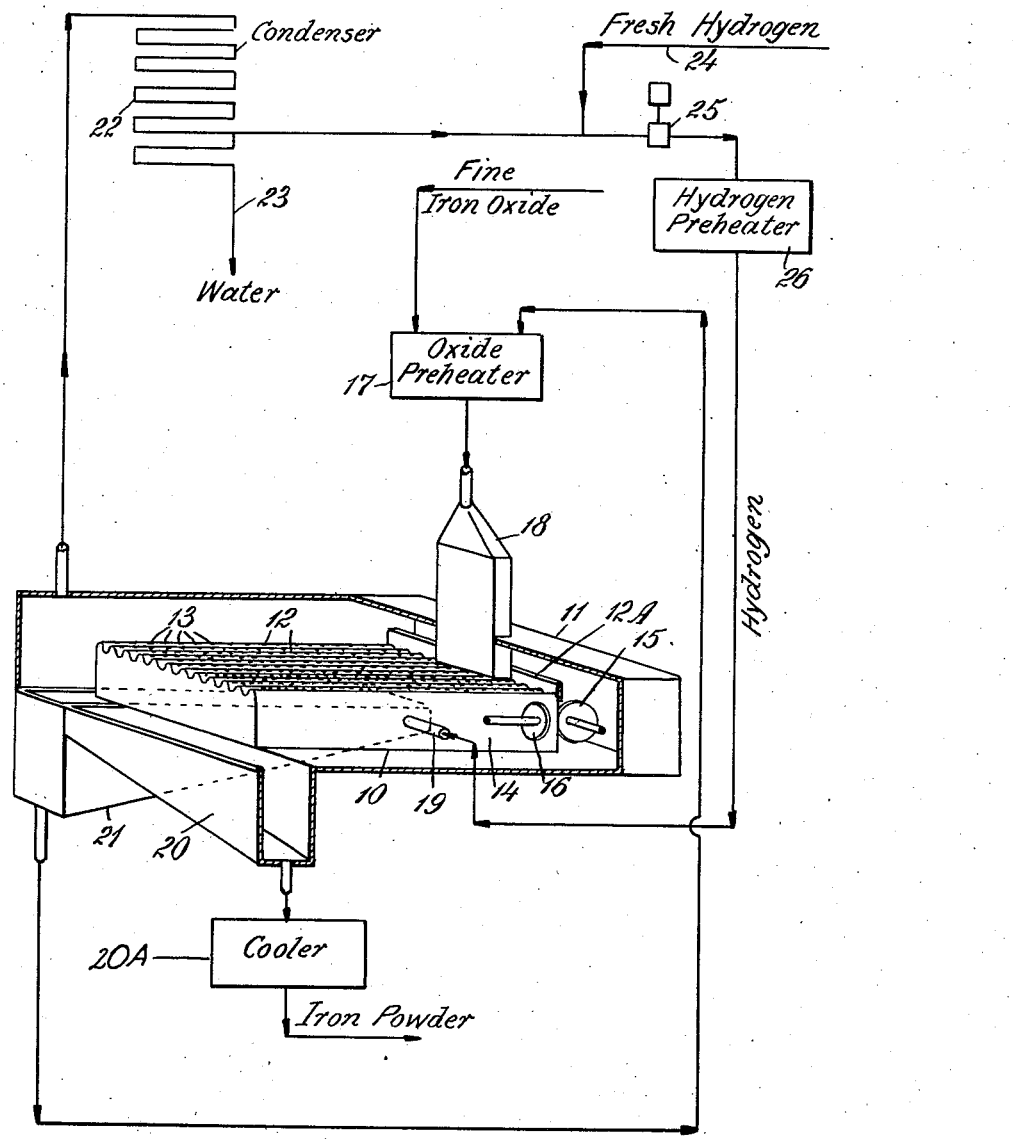
INVENTOR
Charles Hardy
BY
ATTORNEYS Patented Mar. 25, 1941

2,236,474

UNITED STATES PATENT OFFICE 2,236,474

REDUCTION OF METAL COMPOUNDS WITHOUT FUSION

Charles Hardy, Pelham Manor, N. Y., assignor to Hardy Metallurgical Company, New York, N. Y., a corporation of Delaware Application December 23, 1939, Serial No. 310,791

13 Claims. (Cl. 75—35)

This invention is concerned with producing finely divided metal, particularly metal powders, by reduction of compounds of such metal (such, for example, as finely divided oxides) employing reducing gases but without substantial fusion. In its preferred aspect, the invention contemplates the production of iron powder directly from finely divided iron oxides by means of hot hydrogen. It aims to provide improved methods of production of metal powders, particularly iron, to the end that a clean product satisfactory for use in powder metallurgy shall be produced at low cost.

The manufacture of iron and steel objects by compressing and heat treating iron powders necessitates a clean starting material substantially free of oxide films and non-metallic inclusions. Iron powder of excellent quality has been produced by electrolysis, but it is relatively expensive. Pyro-metallurgical processes for the production of iron powder and the like are considerably cheaper but entail operating difficulties. Thus, there is a tendency for incomplete reduction, due to the fact that not all portions of the oxidized starting material come into adequate contact with the reducing agent, with resultant inclusion of oxide or other compounds in the product. Moreover, the iron particles as formed tend to stick together or to the walls of the receptacle. In consequence of these and other operating difficulties, the economies sought to be realized through the manufacture of iron powder of satisfactory quality by so-called "sponge iron" processes have not been attained, at least to an adequate extent.

As a result of my investigations, I have developed improvements in methods of and apparatus for reducing finely divided metallic oxides and other compounds, particularly iron oxide, which insure improved contact between reducing agent and particles to be reduced with improvement in efficiency and degree of reduction. Processes conducted in accordance with my invention also tend to inhibit the objectionable sticking together of newly formed iron particles and the like, which has been prevalent heretofore. Moreover, my invention in its preferred embodiment permits separation of completely reduced particles from incompletely reduced particles during the actual reduction step. This separation is such that particles which require more stringent treatment to bring about reduction remain in the reduction zone for a longer period either by travelling therethrough at a slower rate or over a longer path so that their opportunity for reduction is enhanced. Thus, my invention contemplates, in the formation of finely divided solid metal by reducing fine particles of a compound thereof with a hot reducing gas, the improvement which comprises causing a bed of the particles to move along a deck upon which the bed is supported, while passing the hot reducing gas in contact with the particles and while imparting relative movement to the particles of the bed by shaking. In the preferred embodiment, the invention contemplates passing the hot reducing gas through the bed (preferably from below) and in any case transverse to the direction of movement of the bed while imparting a "tabling" movement to the bed, for example, by shaking or vibrating the deck. In short, in the preferred aspect of my invention the particles to be reduced are subjected to a tabling action while being treated with the reducing gas, with the result that incompletely reduced (and consequently lighter) portions of the material tend to migrate to one portion of the table or deck while completely reduced (and consequently heavier) particles tend to migrate to another point. The completely reduced particles may be removed from the point to which they migrate as a finished product. The incompletely reduced particles are removed from the other portion of the deck and are, if desired, returned to the table for further treatment.

The apparatus of my invention in preferred forms comprises a perforated deck that forms the top of a gas chamber. The perforations in the deck are so small that the solid particles passing thereover are prevented from passing through them. The hot reducing gas, say, hydrogen, may be sucked through the bed into the underlying chamber but preferably the gas is forced upwardly through the bed from the chamber which is maintained under a slight positive pressure. The apparatus is claimed in my copending divisional application Serial No. 315,963, filed January 27, 1940.

It is preferable to preheat the material to be reduced (say, finely divided magnetite) before sending it to the table. Likewise the hydrogen or other reducing gas should be heated to reaction temperature. In the case of iron reduction the reaction is best conducted at temperatures ranging from 650° C. to 1000° C. and preferably at a temperature below 800° C., since above this temperature there is an increase in tendency for the sticking together of the particles.

The used reducing gases containing the gaseous products of reduction (say, water vapor), together with excess reducing agent (say, hydrogen) may be treated to remove the products of reduction (for example, by condensation) and then returned to the process. Thus, in the case of hydrogen, gases withdrawn from the reducing zone are cooled to bring about condensation of water vapor resulting from the reduction of iron oxide and the water vapor is condensed and removed from the circuit, the residual hydrogen being returned to the operation after preheating.

A variety of known forms of tabling devices may be employed. Thus, a Sutton-Steele pneumatic table of heat-resisting construction with a porous metal deck may be employed, the table being enclosed within a furnace chamber. The general form of the Sutton-Steele pneumatic table is well-known and is described, for example, in "Textbook of Ore Dressing," by Truscott, 1923, page 574. Other forms of pneumatic shaking tables, such as that illustrated on pages 938–939 of "Handbook of Ore Dressing" by Taggart, (1927), may also be employed.

The table may be provided with riffles or corrugations to aid in the separation, but tables without riffles, such as the Sutton-Steele table, are satisfactory in many cases. In fact, it is possible to carry out separation and reduction simultaneously on an inclined metal sheet which is subjected to vibration so as to impart an oscillatory movement to the overlying bed.

The deck of the concentrating table may be formed, as indicated hereinbefore, in various ways. Thus, it may be made in the form of a corrugated metal sheet overlying the gas chamber, with rows of fine holes along the uppermost portions of the corrugations or riffles. The deck may also be in the form of a plain or corrugated sheet made with controlled porosity by compressing and heat treating metal powders. Such a sheet has a great number of very fine tortuous pores running through it and is admirably adapted to serve in the operation of my invention.

A variety of motions are known for bringing about concentration or separation on shaking tables, and the invention may employ the action of pneumatic shaking tables, such as the Sutton-Steele table, or it may employ motions heretofore employed in wet tabling. A very satisfactory form of motion for a riffled table is imparted by a pair of eccentric cams, one of which shakes the table lengthwise and the other laterally, giving a resultant that is oblique to the riffles. The heavier particles of reduced metal tend to remain in the bottom of the riffles and travel to the end of the table therein. Incompletely reduced particles are lighter and tend to ride over the riffles passing to the side of the table. An impetus should be given to the particles to cause them to move along the deck. This may be done by imparting a slope to the deck, or by shaking the deck in its plane with a forward stroke that is faster than the backward stroke, or by a current of the reducing gas which blows the particles along the deck.

In the operation of my invention, the particles on the deck are kept in almost constant movement with respect to the deck and with respect to each other so that new surfaces are constantly being exposed to the action of the reducing gas. At the same time, the movement between the particles tends to inhibit sticking, provided that the temperature of operation is not too high.

These and other aspects of my invention will be more thoroughly understood in the light of the following detailed description taken in conjunction with the accompanying single figure which is a flow sheet of a preferred form of my invention employing a shaking table having a perforated corrugated deck of heat-resistant metal.

Referring now to the figure, it will be observed that there is provided a shaking table 10 enclosed within a furnace or reduction chamber 11 (fragmentarily shown). The shaking table has a corrugated deck 12, the corrugations of which extend parallel to each other and approximately lengthwise of the table. The ridge of each of the series of corrugations is perforated and has a series of small holes 13 running lengthwise of the ridge. The deck is disposed above and forms the top of a gas chamber 14. The shaking motion is imparted to the table by a plurality of eccentric cams. Thus, cam 15 is mounted to bump periodically against the end of the table, while a second cam 16 is mounted to bump periodically against the side of the table. The table is movably mounted on conventional supports, not shown and springs or other conventional means (not shown) are provided for restoring the table to its original position after it has been bumped.

Feed to the table, for example, a magnetite sand ranging in size from 80 mesh to 16 mesh, Tyler scale, is passed in a dry condition through a preheater 17 of conventional form such, for example, as a rabbled hearth wherein it may be heated directly with a flame. The preheated feed particles at a temperature of say 700° C. are then fed gradually and continuously through a chute 18 that passes through the roof of the furnace 11, so that the feed is dropped on one end of the table adjacent its end baffle 12A. Hot hydrogen gas is passed into the gas chamber 14 underneath the table, passes through the perforations or pores 13 in the deck to come in contact with the particles to be reduced. The hydrogen may be introduced into the table chamber conveniently through a flexible connection 19.

A bed of particles is formed upon the deck of the table and tends to move away from the chute due to the shaking of the table brought about by the cams. The hydrogen gas comes in contact with the particles of iron oxide and tends to reduce them rapidly. Particles which are completely reduced and hence are principally iron tend to travel longitudinally in the valleys of the corrugations and to drop off the end of the deck into a concentrate collector chute 20 and thence pass to an airtight cooler 20A. The cool finished product (iron powder) is withdrawn from the cooler. Incompletely reduced particles tend to travel to the rear side of the table across the corrugations. In so doing, their rate of passage on the table is substantially retarded and they remain in the reduction zone for a longer time, coming into contact with the hot hydrogen gas which issues from the holes in the deck. If in the travel across the deck the particles become completely reduced they will tend to be delivered at the end of the table. Otherwise they pass off the rear edge of the table into a tailing collecting chute 21 from which they may be wasted or returned to the oxide preheater 17.

In the reaction between the iron oxide and the hot hydrogen, water vapor is produced and this water vapor, together with excess hydrogen is removed from the furnace chamber 11 and passed to a condenser 22 wherein the gas is cooled to the point where the water condenses and is drained out of the system through a line 23. The uncondensed hydrogen from the condenser, together with fresh hydrogen from an exterior source 24 is pumped by means of a conventional vapor pump 25 through a conventional hydrogen preheater 26 and is then returned to the gas chamber of the table through the flexible connection 19.

As indicated hereinbefore, the table deck may be made as a porous metal sheet, either corrugated or plain, by powder metallurgical methods and various table shaking means other than the one illustrated may be employed.

If desired, a current of gas may be blown along the table from a pipe (not shown) that is maintained under positive pressure. This gas current, together with the transverse gas current of gas forced upward through the bed tends to impart a swirling action to the lighter particles lying on the top of the bed which aids in their reduction.

Although I have described my invention in detail with reference to the reduction of iron oxide with hydrogen, it will be apparent that oxides and other compounds of other metals may be reduced in the process of my invention with various reducing gases such, for example, as carbon monoxide.

I claim:

1. In the formation of finely divided pieces of metal by reducing particles of a compound of a metal with a hot gaseous reducing agent without substantial fusion, the improvement which comprises passing the hot reducing gas through a bed of the particles while on a deck, simultaneously imparting an oscillatory motion to the deck to cause the particles to move therealong and to cause a separation of the particles thereon according to specific gravity, the hot reducing gas being passed through the bed of particles transversely to their direction of travel along the deck, and removing the resulting finely divided solid metal from an end portion of the deck.

2. In the formation of finely divided pieces of metal by reducing particles of a compound of a metal with a hot gaseous reducing agent without substantial fusion, the improvement which comprises substantially continuously passing the hot reducing gas through a bed of the particles while on a deck, and simultaneously imparting an oscillatory motion to the deck to cause the particles to move therealong and to cause a separation of the particles thereon according to specific gravity, the hot reducing gas being passed through the bed of particles transversely to their direction of travel along the deck.

3. In the formation of finely divided pieces of metal by reducing particles of a compound of a metal with a hot gaseous reducing agent without substantial fusion, the improvement which comprises passing the hot reducing gas upwardly through a bed of the particles at a plurality of points between particles while the bed is on a deck, and simultaneously imparting an oscillatory motion to the deck to cause the particles to move therealong and to cause a separation of the particles thereon according to specific gravity, the hot reducing gas being passed through the bed of particles transversely to their direction of travel along the deck.

4. In the formation of finely divided pieces of metal by reducing particles of a compound of a metal with a hot gaseous reducing agent without substantial fusion, the improvement which comprises passing the hot reducing gas in contact with a bed of the particles disposed on a deck while subjecting the particles to separation by tabling.

5. In the formation of finely divided pieces of metal by reducing particles of a compound of a metal with a hot gaseous reducing agent without substantial fusion, the improvement which comprises passing the hot reducing gas upwardly through a bed of the particles disposed on a deck while imparting a shaking motion to the deck and causing the particles to move with respect to each other and to travel along the deck, heavier particles being removed from one portion of the deck and lighter particles being separated from the heavier particles and removed from another portion of the deck.

6. In the formation of finely divided pieces of metal by reducing particles of a compound of a metal with a hot gaseous reducing agent without substantial fusion, the improvement which comprises passing the hot reducing gas upwardly through a bed of the particles disposed on a deck provided with a plurality of riffles extending in the same general direction and imparting an approximately horizontal shaking motion to the deck in a direction oblique to the riffles so that metal powders of relatively high specific gravity formed by the reduction travel along the deck in the direction of the riffles and lighter particles containing unreduced metal tend to travel across the riffles.

7. In the formation of finely divided pieces of metal by reducing particles of a compound of a metal with a hot gaseous reducing agent without substantial fusion, the improvement which comprises passing the hot reducing gas through a bed of said particles disposed on the deck while moving the bed along the deck and while bringing about the separation of particles of different specific gravity by shaking.

8. In the formation of finely divided pieces of metal by reducing particles of a compound of a metal with a hot gaseous reducing agent without substantial fusion, the improvement which comprises passing the hot reducing gas upwardly through a bed of the particles disposed on a deck while separating particles of different specific gravity by imparting a tabling motion to the deck, the deck being shaken with a stroke that is relatively more rapid in one direction than in the opposite direction, and collecting metal particles resulting from the reduction from one portion of the table and collecting lighter and incompletely reduced particles from another portion of the table.

9. In the formation of finely divided pieces of iron by subjecting small particles of a compound thereof to the action of a hot reducing gas, the improvement which comprises passing the hot gas through a bed of the particles on a deck while subjecting the deck to a tabling motion such that separation of particles of different specific gravity takes place on the deck.

10. In the reduction of finely divided iron oxide particles by treatment in a hot reducing gas to form finely divided iron particles the improvement which comprises passing the hot gas in contact with a bed of the particles while subjecting the bed to a tabling motion to separate particles of high metallic iron content from less completely reduced particles.

11. In the formation of finely divided solid iron particles by subjecting small particles of iron oxide to the action of hot hydrogen without substantial fusion of the resulting particles of the iron, the improvement which comprises passing the hot hydrogen in contact with a bed of the particles while subjecting the bed to a tabling motion to separate particles of relatively high metallic iron content from incompletely reduced particles, withdrawing the incompletely reduced particles from one portion of the deck and returning them to the deck.

12. In the formation of finely divided solid iron particles by subjecting small particles of iron oxide to the action of hot hydrogen without substantial fusion of the resulting particles of iron, the improvement which comprises passing the hot hydrogen in contact with a bed of the particles while subjecting the bed to a tabling motion to separate particles of relatively high metallic iron content from incompletely reduced particles, withdrawing excess hot hydrogen containing water vapor resulting from the reduction of the iron oxide from contact with the particles, condensing the water vapor and separating it from the hydrogen and returning the purified hydrogen to contact with unreduced particles on the deck.

13. In the formation of finely divided iron powder by subjecting small particles of iron oxide to the action of hot hydrogen, the improvement which comprises passing hot hydrogen in contact with a bed of the particles in a reduction zone while subjecting the bed to shaking to bring about separation of powders containing a relatively large proportion of metallic iron from relatively unreduced particles, the particles fed to the reduction zone being preheated.

CHARLES HARDY.